March 2, 1971  H. B. KNECHTEL  3,567,465
PROCESS OF MAKING SUNFLOWER SEEDPASTE
Filed April 15, 1968
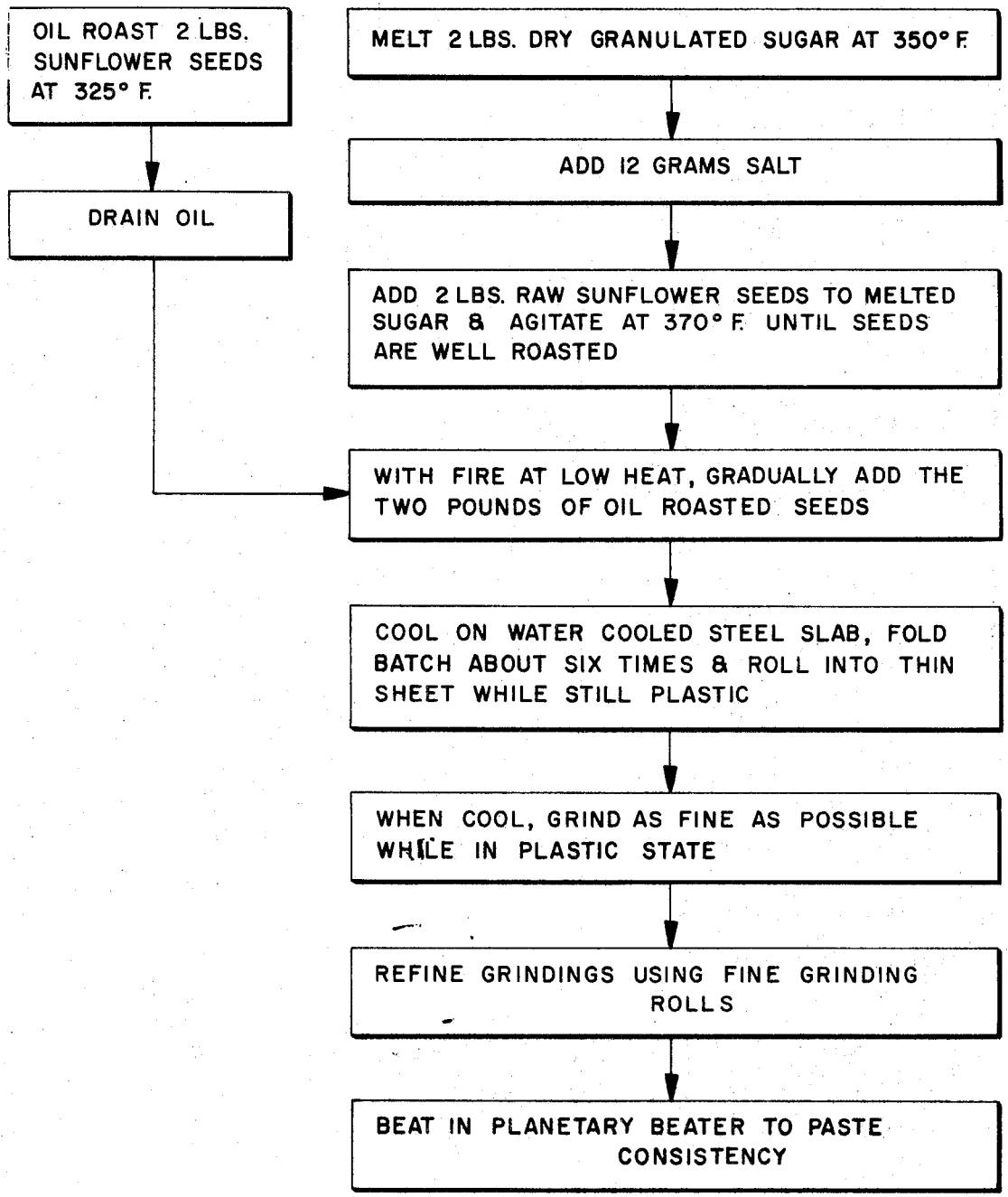
INVENTOR.
HERBERT B. KNECHTEL
BY Williamson, Palmatier & Bains
ATTORNEYS United States Patent Office 3,567,465
Patented Mar. 2, 1971

3,567,465
PROCESS OF MAKING SUNFLOWER SEED PASTE
Herbert B. Knechtel, Park Ridge, Ill., assignor to
Dahlgren & Company, Inc., Crookston, Minn.
Filed Apr. 15, 1968, Ser. No. 721,290
Int. Cl. A23l 1/36
U.S. Cl. 99—134                                    1 Claim

ABSTRACT OF THE DISCLOSURE

A sunflower seed paste spread and process of making the same wherein a predetermined amount of sunflower seed meats are heated in a predetermined volume of melted sugar to cause the sunflower seed meats to become roasted. An additional quantity of sunflower seed meats is then roasted in oil, and the oil is drained therefrom, and the oil roasted seed meats are then admixed with said mixture of roasted sunflower seed meats and syrup. The mixture is then cooled and pulverized to form a paste which has a creamy texture and a pleasant savory sunflower seed meat flavor.

SUMMARY OF THE INVENTION

It is an object of this invention to provide a sunflower seed paste and process of making the same. The paste has a creamy texture with a distinct roasted sunflower seed meat flavor and is adapted for use in making confectionery products, such as candy and the like. In making the sunflower seed paste, whole sunflower seed meats are roasted and blended with melted sugar and then ground into a pulverulent state to form a creamy paste which not only may be used in the production of confectionery products but also may be combined with chocolate for use as a pleasant uniquely flavored spread.

BRIEF DESCRIPTION OF THE DRAWINGS

The single figure of the drawing is a block diagram graphically illustrating the various steps used in carrying out the process.

DETAILED DESCRIPTION OF THE INVENTION

It has been found that sunflower seed meats not only possess a relatively high nutritional value, but these seed meats also have a pleasant but unique flavor which is quite distinctive from other edible seeds, nut meats and the like. The present invention is directed to a novel food composition and specifically to an edible paste derived from roasted sunflower seed meats which may be made into a highly flavorable spread and which is especially adaptable for use in the production of confectionery products.

This novel sunflower seed meat composition is derived from a blend of roasted sunflower seed meats and a sugar syrup which are combined together in such a manner as to yield a paste of creamy texture which has a highly unique sunflower seed meat flavor. This sunflower seed meat paste is broadly similar to peanut butter, coconut butter, and the like and may be used in the production of confectionery products, such as candy. The product may also be combined with chocolate to form a highly delectable spread.

In the present process, whole sunflower seed meats are roasted in an oil bath at a temperature sufficient to remove substantially all of the moisture from the seed meats. These roasted seed meats are then removed from the oil and are then combined with a mixture of syrup and another quantity of roasted sunflower seed meats. The syrup is formed by melting granulated sugar at a temperature of approximately 350° F., and whole raw sunflower seed meats are added to the heated syrup and this mixture is heated until the moisture is removed from the sunflower seeds.

The oil roasted sunflower seed meats are then added to the mixture of roasted seeds and syrup and the admixture is thereafter cooled. It is essential during the cooling step that the mixture of syrup and roasted sunflower seeds be agitated to evenly distribute the sugar in order to obtain a homogeneous material. In order to facilitate cooling, the admixture may be rolled into a thin sheet after which it is subjected to the action of grinding rolls so that the whole roasted sunflower seeds are crushed. The grinding is continued and this admixture is finally subjected to the action of fine grinding rolls so that the seed meats are crushed into a pulverulent state.

Thereafter, the admixture of syrup and pulverized whole roasted sunflower seed meats is subjected to the action of an agitator to work the material into a paste consistency. The paste has a creamy texture and has a highly distinctive pleasant sunflower seed taste.

Referring to the drawing, it will be seen that in the present process, one batch of whole raw sunflower seed meats is heated in an oil bath to cause the roasting of these seed meats. There are many suitable oils that may be used, such as hydrogenated cotton seed oil, sunflower seed oil, coconut oil and peanut oil. These sunflower seed meats are immersed in oil and are heated to a temperature within a range of 315°–335° F., preferably at a temperature of 325° F. During this roasting step, substantially all of the moisture is removed from the whole sunflower seed meats and the seed meats are then removed from the oil bath and the oil is allowed to drain therefrom.

A second batch of raw whole sunflower seed meats is introduced into a sugar syrup which is formed by heating granulated sugar to a temperature within the range of 340°–360° F., preferably at approximately at 350° F. The syrup also contains a small quantity of common table salt which may be added thereto at any convenient time. The second batch of raw whole sunflower seed meats is added to the heated syrup and this admixture is agitated and the temperature is raised from approximately 350° F. to 365° F.–375° F., and preferably 370° F. This heating is continued until the sunflower seed meats are well roasted. These roasted seed meats, of course, will have most of the moisture removed therefrom.

When the oil roasted seed meats are added to the admixture of syrup and roasted sunflower seed meats, the oil roasted seed meats are gradually added while the syrup and seed meat mixture is maintained at a temperature within the range of 265° to 290° F., preferably at approximately 270° F. After the oil roasted seed meats have been combined with the mixture of roasted sunflower seed meats and syrup, the mixture is then removed from the heating zone and is allowed to cool. In this regard, the material may be placed upon a water-cooled steel slab to expedite the cooling but it is essential to work or fold the material during this cooling to evenly distribute the syrup or liquid sugar. After the material has been folded or otherwise worked several times during the cooling process, the material will still be in a plastic state and may be rolled into a thin sheet to further facilitate cooling thereof.

After the admixture has been sufficiently cooled, it is then subjected to a crushing or grinding action to crush the roasted sunflower seed meats and this may be accomplished by suitable roll crushers. Ordinarily, the material will have to be passed through the crushing rolls several times in order to suitably crush and grind the sunflower seeds. In order to render the crushed seeds into an extremely fine condition or pulverulent state, it is necessary to pass the crushed seeds through refining rolls, such as are used in the refining or processing of chocolate. One or more passes of the material through the refining rolls will be made so that the sunflower seed meats are ground to an extremely fine state.

The pulverized mixture is placed in a planetary beater or other suitable working device and it is worked and agitated until it is of paste consistency. This paste is creamy with a smooth texture and has a pleasant roasted sunflower seed meat taste.

Although the present process contemplates the step of oil roasting a predetermined amount of sunflower seed meats, in some instances it may be desirable to dry roast the sunflower seed meats. The paste may be used in the production of confectionery products, such as candy and it has been found that when mixed with chocolate, the paste may then be used as a spread, broadly similar to peanut butter or the like. The paste contains approximately 49% pulverized sunflower seed meats, approximately 49% sugar, approximately 0.5% to 1% moisture, and 1% trace elements including oil used in the oil roasting step. The paste has a natural gray appearance and suitable artificial coloring may be added if desired. The following are examples of the process.

EXAMPLE 1

Approximately two pounds of raw, whole sunflower seed meats were roasted in hydrogenated cotton seed oil at a temperature of 325° F. until substantially all of the moisture was removed from the seed meats. Thereafter, the roasted seed meats were removed from the oil and the oil was allowed to drain therefrom. Two pounds of dry granulated sugar was heated to 350° F. to melt the sugar and to form a syrup. Twelve grams of common table salt, sodium chloride, was added to the heated syrup. Two pounds of raw sunflower seed meats were added to the heated sugar syrup and the admixture was agitated as the seed meats were being added. The admixture was then heated to a temperature of approximately 370° F. and held at this temperature for a short time thus resulting in well roasting of the sunflower seed meats.

The admixture of sunflower seed meats and syrup was allowed to cool to approximately 270° F. and the oil roasted seed meats were gradually added to this admixture while simultaneously agitating the mixture. The mixture of sunflower seed meats and syrup was removed from the heating zone and placed on a water cooled steel slab for the purpose of cooling the same. During this cooling step, the admixture was worked by folding the material approximately six times to evenly distribute the liquid sugar. The material which is in a plastic condition at this time is rolled into a thin sheet to further facilitate cooling thereof.

After the thin sheet has cooled, the material is then fed into suitable grinding apparatus to crush the whole sunflower seed meats. The crushing or grinding step is repeated until the whole sunflower meats are crushed to a relatively fine condition. Thereafter, the material is passed through chocolate refining rolls one or more times to pulverize the crushed sunflower seed meats into a pulverulent state. The mixture is then placed in a planetary beater and agitated or worked until it reaches a paste consistency. The paste is creamy, has a smooth texture, is slightly gray in appearance and has a very pleasant roasted sunflower meat flavor. It has spreadability characteristics similar to peanut butter and has a very pleasant nutty aroma.

EXAMPLE 2

The steps and materials of Example 1 were repeated except the initial quantity of raw sunflower seed meats was roasted in sunflower seed oil instead of cotton seed oil.

From the foregoing description, it will be noted that I have provided a novel process for making a sunflower seed meat paste which has a pleasant, savory, roasted flavor and is adapted for use as a spread and in the production of confectionery products.

It will, of course, be understood that various changes may be made in the form, details, arrangement and proportions of the various parts without departing from the scope of my invention.

What I claim is:

1. A process for making an edible sunflower seed paste comprising:

placing a predetermined amount of sunflower seed meats in an edible oil selected from the group comprising cotton seed oil, peanut oil, sunflower seed oil and coconut oil, heating the oil to a temperature of approximately 315° F. to 335° F. to remove substantially all of the moisture from the sunflower seed meats, heating a predetermined amount of sugar to melt the same to thereby form a syrup, adding a predetermined amount of raw sunflower seed meats to said melted sugar and heating the admixture to a temperature of approximately 360° F. to 380° F. to roast the sunflower seed meats, and to remove substantially all of the moisture from the sunflower seed meats, the amount of said sunflower seed meats being equal to the amount of the first mentioned sunflower meats, removing said first-mentioned sunflower seed meats from the oil and adding the same to said mixture of syrup and sunflower seed meats while simultaneously agitating said admixture, cooling said admixture of sunflower seed meats and syrup and further agitating said admixture to evenly distribute the liquid sugar, rolling said admixture of syrup and whole roasted sunflower seed meats into a thin sheet during said cooling step, thereafter grinding said cooled admixture until the roasted sunflower seed meats are in a pulverulent state, then working said ground admixture to a paste consistency.

References Cited

UNITED STATES PATENTS

| 1,063,208 | 6/1913 | Norton | 99—126 |
| 1,142,346 | 6/1915 | Mariner | 99—126 |
| 2,859,121 | 11/1958 | Avera | 99—126 |

OTHER REFERENCES

Cornfeld: "Israeli Cookery," 1962, Tere Avi Publishing Co., Inc., Westport, Conn., pp. 13, 21, 34, 35.

JOSEPH M. GOLIAN, Primary Examiner

U.S. Cl. X.R.

99—1, 128